US008358778B2

(12) United States Patent
Landrock et al.

(10) Patent No.: US 8,358,778 B2
(45) Date of Patent: Jan. 22, 2013

(54) COMPUTATIONALLY ASYMMETRIC CRYPTOGRAPHIC SYSTEMS

(75) Inventors: Peter Landrock, Cambridge (GB); Jonathan Roshan Tuliani, Cambridge (GB)

(73) Assignee: Cryptomathic Ltd., Cambridge, Cambridgeshire (GB)

( * ) Notice: Subject to any disclaimer, the term of this patent is extended or adjusted under 35 U.S.C. 154(b) by 1194 days.

(21) Appl. No.: 11/579,843

(22) PCT Filed: Feb. 4, 2005

(86) PCT No.: PCT/GB2005/050011
§ 371 (c)(1),
(2), (4) Date: Sep. 18, 2007

(87) PCT Pub. No.: WO2008/117335
PCT Pub. Date: Dec. 8, 2005

(65) Prior Publication Data
US 2008/0285746 A1 Nov. 20, 2008

(30) Foreign Application Priority Data

May 26, 2004 (GB) .................................. 0411777.6

(51) Int. Cl.
*G06F 21/00* (2006.01)
(52) U.S. Cl. ............................................. 380/28; 380/29
(58) Field of Classification Search .................. None
See application file for complete search history.

(56) References Cited

U.S. PATENT DOCUMENTS

| 5,633,929 | A  | * | 5/1997 | Kaliski, Jr. ...................... | 380/286 |
| 6,079,018 | A  | * | 6/2000 | Hardy et al. .................. | 713/170 |
| 6,795,919 | B1 | * | 9/2004 | Gibbs et al. .................. | 713/170 |
| 6,816,969 | B2 | * | 11/2004 | Miyazaki et al. ............. | 713/180 |
| 7,136,484 | B1 | * | 11/2006 | Koh .............................. | 380/28 |
| 2004/0153452 | A1 | * | 8/2004 | Carro .............................. | 707/9 |
| 2005/0050364 | A1 | * | 3/2005 | Feng ............................. | 713/201 |

OTHER PUBLICATIONS

A. Menezes, P. Van Oorschot, S. Vanstone, "Handbook of Applied Cryptography," CRC Press, Oct. 1996, Chapters 9.*
A. Menezes, P. Van Oorschot, S. Vanstone, "Handbook of Applied Cryptography," CRC Press, Oct. 1996, pp. 425-488.
E. Magkos, P. Kotzanikolaou, V. Chrissikopoulos, "An Asymmetric Traceability Scheme for Copyright Protection Without Trusts Assumptions," Lecture Notes in Computer Science, vol. 2115 (Sep. 4, 2001), pp. 186-195, XP002326369 Munich ISSN: 0302-9743.
Mao Wenbo, "Timed-Release Cryptography," HP Labs, (Dec. 18, 2001), pp. 1-16, XP002204373.
R.L. Rivest, A. Samir, D.A. Wagner, "Time Lock Puzzles and Times Release Crypto," (Feb. 21, 1996), pp. 1-8, XP002326370.

* cited by examiner

*Primary Examiner* — Jeffrey Pwu
*Assistant Examiner* — Helai Salehi
(74) *Attorney, Agent, or Firm* — Knobbe, Martens, Olson & Bear, LLP

(57) ABSTRACT

This invention is generally concerned with methods, apparatus and computer program code for a computationally asymmetric hash function, in particular for use with symmetric cryptographic algorithms. We describe a method of determining a computationally asymmetric hash function value, the method including: receiving input data to be hashed; computing an asymmetric value from said input data, said asymmetric value being computable by two methods, a first method employing at least one first parameter and a second method employing at least one second parameter, computation of said asymmetric value by said second method being faster than by said first method; and determining a computationally asymmetric hash function value using said asymmetric value. We also describe methods of providing a computationally asymmetric electronic signature from a symmetric cryptographic signature.

26 Claims, 8 Drawing Sheets

COMPUTATIONALLY ASYMMETRIC CRYPTOGRAPHIC SYSTEMS

This invention is generally concerned with methods, apparatus and computer program code for a computationally asymmetric hash function and computationally asymmetric electronic signatures, in particular for use with symmetric cryptographic algorithms.

In this specification applications of embodiments of the invention will be described with specific reference to electronic signatures computed using a symmetric key shared with the party validating the signature. As will be seen below, a computationally asymmetric cryptographic hash function can provide significant benefits within such a context; however applications of the invention are not limited such a context.

Symmetric cryptography uses a common secret key for both encryption and decryption; a number of techniques are available for restricting access to this key and one example will be described below. Typically a different key is derived from this secret key for each encrypted message or for a small group of encrypted messages. A well known example of symmetric cryptography is the US Data Encryption Standard (DES) algorithm and its variant triple DES (in which three keys are used in succession for additional security); other examples include RC4 and the International Data Encryption Algorithm (IDEA).

One commonly used technique for generating digital or electronic signatures employs asymmetric or public key cryptography which uses a pair of keys, one private and one "public"; an infrastructure known as PKI (Public Key Infrastructure) is often used to provide key management functions. However digital or "electronic" signatures can also be generated using symmetric cryptography although these are potentially weaker cryptographically. An example is a message authentication code (MAC) which is computed using the aforementioned shared secret key. An example MAC is provided in ISO8731-1, "Banking-proved Algorithms for Message Authentication-Part I; DEA"; another example is described in "Computer Data Authentication", National Bureau of Standards, FIPS113, 1985. In this specification we describe computationally asymmetric systems (some variants of which use a combination of both symmetric and asymmetric cryptographic procedures), in embodiments computational asymmetry referring to a difference in computation speed between, for example, generating and verifying a signature.

We describe below a recently proposed scheme, the MasterCard Chip Authentication Program (CAP) scheme in which a chip on a card operating in accordance with EMV (Europay Mastercard Visa) algorithms stores tie secret key of a symmetric cryptographic algorithm. This key is effectively unlocked by a PIN (Personal Identification Number) which allows access to a cryptographic operation for implementing a challenge-response mechanism. In the proposal the card is inserted into a calculator type device with a display screen and keyboard to allow a user to enter a challenge value, typically eight digits, the device then displaying the response. The response acts as an electronic signature; the challenge is derived from a message to be signed. In one application of embodiments of the invention there is provided computer program code, such as an application on a server or, preferably, an applet on a user PC (personal computer) which derives an improved challenge providing enhanced security.

Referring to FIG. 1, as previously mentioned authenticating a message M using a symmetric key K is typically performed using a message authentication code (MAC). FIG. 1 shows a case in which a device DK containing the key K is not connected to a device DM containing the message M. Thus, for example, M may be contained within a users PC and the key K in an unconnected authentication token, here a small device with a numeric keypad and screen and customised functionality. In the example of FIG. 1 communication of information between DM and DK is performed manually by the user. Conventional MAC algorithms or digital signatures are not suitable for such an arrangement as they generally require more information to be transferred between DM and DK than a user can easily or reliably manage.

In FIG. 1 device DM may comprise any type of device incorporating a data processor, for example a personal computer, a personal organiser or PDA (Personal Digital Assistant), a mobile phone, a home entertainment device such as a television, or any other type of device. Device DM is coupled to a back end data processor DP, for example at a bank, via a communications network 100. Again DP may comprise any type of data processing system. Communications network 100 may comprise any type of fixed or wireless communications network or combination thereof including, but not limited to, the Internet, a personal, local or wide area network, a mobile phone network, a cable TV network, or any combination thereof.

An electronic signature S may be computed on a message M using a key K by the procedure given below. Generally both S and M are communicated from device DM to device DP, although S and M need not take the same communications path. Alternatively S and M may go to different destinations, for example for providing an audit function.

An electronic signature may be computed as follows:
1. The device DM computes a cryptographic hash H of the message M.
2. DM truncates (or otherwise extracts a shorter value from) H to form a value C, whose length is sufficiently short to be reliably transcribed by the user, and which may be keyed in on the token DK, for example after decimalisation.
3. The user enters C into their token DK. (They may also enter additional authenticating information such as their PIN or, for example, some additional details related to the message.)
4. The token DK encrypts C using the key K, and truncates, and optionally decimalises, the response to form the signature value S.
5. The token DK displays the signature value S which is entered into the device DM to be used as an electronic signature on the message M.

The party validating the signature essentially repeats the same process, since they are also in possession of the key K, and compares the value S thus obtained with that provided.

In practice, so that a different signature is produced for each message, even if the message has been transmitted before, a signing key may be generating by encrypting a counter stored in token DK (or more particularly on a card inserted into the calculator-type device), device DP keeping track of the counter value and/or, say the last two counter digits being sent with the message or signature, to assist in counter synchronisation. Alternatively, the device DK may maintain a clock, and include the current time in the calculation of the signature S, or the device DM may maintain a clock and include the current time in the calculation of the challenge C. In any event, the purpose is the same: to prevent a so-called replay attack in which a previously signed message is re-submitted to the device DP.

To gain some practical appreciation of the operation of the technique, a hash of length 128 bits for practical purposes provides a substantially unique value for each message but this is far too long for user enter into their token DK. This may therefore be truncated and decimalised to provide an eight digit number but a problem with this is that only one hundred million tries are needed to break the code by finding an alternative message corresponding to the same number, which may amount to just an hour of computer time. There is therefore a risk that an attacker could spoof a message M', with a different hash to the message M, but with the same value C for the challenge and thus the same signature value S would be accepted as authenticating either the original message M or the attacker's message M'.

Thus on intercepting a signed message (M, S) an attacker may wish to substitute their own message M' in place of M, without invalidating the signature. That is, they must compute a message M' for which the signature S is also valid. The primary purpose of the cryptographic hash H is to prevent the attacker computing M' such that H'=H. However, due to the truncation of H to form C, it may be possible to find a value M' such that the truncated hash C' of M' is equal to C.

There is a limit to the length of the value C that may be employed due to the fact that it must be reliably transcribed by the human user from the device DM to the token DK. The length of the value C also limits the number of attempts at a message M' that the attacker is expected to need before a successful match C'=C is found.

With the ever-increasing power of the computers available to the attacker (who may use many computers to parallelise the work), it may already be or will certainly become quite feasible for an attacker to break such schemes as are currently being deployed in a reasonable time.

A standard cryptographic technique in similar circumstances is to use a computationally intensive procedure for the computation of H from M. For example, use a normal hash function iterated (say) 1,000 times. The time taken (say 1 second) is too short to present a problem to the legitimate user, who is calculating just a single value H. However, this technique dramatically increases the workload of the attacker, who must expect to compute many, many such values before they are successful.

However, whilst computationally intensive hash functions are useful in some applications (some password protection schemes, for example), they have a significant disadvantage in this case. As stated, the party validating the signature must repeat the computations performed when the signature was created. In a typical application, this validating party may receive a large number of signed messages from a large population of users. (For example, a bank receiving one signed internet transaction per day from each of its 5 million customers.) The computational effort required by the validating party would in such a case be infeasible, or at least require considerable investment.

According to the present invention there is therefore provided a method of determining a computationally asymmetric hash function value, the method comprising: receiving input data to be hashed; computing an asymmetric value from said input data, said asymmetric value being computable by two methods, a first method employing at least one first parameter and a second method employing at least one second parameter, computation of said asymmetric value by said second method being faster than by said first method; and determining a computationally asymmetric hash function value using said asymmetric value.

In embodiments providing a computationally asymmetric hash function computable by two methods one faster than the other enables an entity at the signing end of a transaction (device DM) to be restricted to the first, slower method whilst a verifier (device DP) is enabled to use the second, faster method. The slow method need not impose a significant burden on a human user since the computation may be constructed so as to take less than ten seconds or less than one second by the slower method, but it will be appreciated a hacker constrained to use the slow method in order to attempt to substitute a different message with the same signature would find an exhaustive search of all the possibilities practically impossible, or at least considerably more onerous. In this situation, in order to provide the verifier with, in effect, a back door the second method should employ at least one parameter which is different to a parameter employed by the first method so that this parameter may be kept secret. Thus in embodiments the at least one second parameter comprises at least one parameter different to the at least one first parameter.

In preferred embodiments at least one first parameter of the slower first method includes a parameter which determines a time taken to perform the asymmetric hash function value computation by the first method. Preferably, therefore, the first and second methods comprise methods of a time-lock puzzle. Such a puzzle may be characterised as having at least two methods of solution, one of which requires the use of a procedure which is intrinsically sequential, for example a procedure which cannot be solved substantially faster with parallel hardware. The other method is preferably not intrinsically sequential in nature and is faster, preferably by at least one, two or three orders of magnitude. An example of a time-lock puzzle is described in more detail later.

In embodiments of the above described methods a hash of the asymmetric value (in embodiments a time-lock puzzle secret value) is determined as this facilitates compatibility with existing symmetric signature procedures. The asymmetric value may be computed from the input data or from a (conventional, symmetric) hash of the input data. In embodiments the at least one first parameter and the at least one second parameter share at least one common parameter, a difference in computation speeds between the first and second methods being dependent upon a value of the at least one common parameter.

In another aspect the invention provides a method of digitally signing data using a computationally asymmetric hash function.

Thus the invention provides a method of providing a signature for data, the method comprising: determining a computationally asymmetric hash function of the data to be signed; outputting data for encryption; and receiving encrypted data derived from said asymmetrical hash function to provide said electronic signature for said data.

The data derived from the computationally asymmetric hash function may, as previously described, comprise a (computationally) asymmetric hash value or a bash of the (computationally) asymmetric hash value, or data derived from the computationally asymmetric hash value in some other way. When implemented on a device such as device DK above the encrypting of data derived from the computationally asymmetric hash function is performed by a physically separate device, but in other embodiments determination of the asymmetric hash function and encryption of data derived from this may be performed on a single computing device or on a plurality of devices in communication with another, for example over a network.

The invention further provides a method of verifying digitally authenticated data, the digitally authenticated data including an electronic signature generated using a computationally asymmetric hash function the method comprising: determining an asymmetric hash function of said signed data;

and verifying said electronic signature using the asymmetric hash function result of said determining.

Preferably the verifying comprises encrypting data derived from the asymmetric hash function and comparing a result of this with the electronic signature.

In the above described methods of signing and verifying digital data preferably the encryption comprises a symmetric cryptographic procedure. In embodiments of the signing method the asymmetric hash function result is truncated prior to outputting for encryption; the encryption itself may utilise or be conditional upon additional information such as a user-entered PIN.

The invention also provides a method of electronically signing data, the method comprising determining a hash value of the data to be signed using a time-lock puzzle algorithm; and encrypting data dependent upon said hash value to sign said data.

In a complimentary aspect the invention provides a method of verifying electronically signed data, the method comprising determining a hash value of at least a portion of the data to be verified using a time-lock puzzle algorithm; and encrypting data dependent on said hash value for comparing with an electronic signature of said data to verify said signed data.

The invention further provides a method providing a computationally asymmetric electronic signature, the method comprising: receiving message data for signing, computing an intermediate value of data derived from said message data; determining a symmetric cryptographic signature of data derived from said intermediate value; and providing said intermediate value in association with said symmetric cryptographic signature to provide a computationally asymmetric signature for said message data.

In a complimentary aspect the invention provides a method of verifying a computationally asymmetric signature, said computationally asymmetric signature comprising a symmetric cryptographic signature and an intermediate value used in computing said symmetric cryptographic signature, the method comprising: receiving message data and said computationally asymmetric signature; verifying said intermediate value using said message data; and verifying said symmetric cryptographic signature using said intermediate value.

Preferably the intermediate value comprises a value computed by an asymmetric cryptographic procedure, in particular an asymmetric cryptographic signature. This intermediate value may be computed on a hash of the message data and afterwards optionally truncated prior to symmetric cryptographic signing. The signatures employed maybe signatures with or without message recovery.

Broadly speaking embodiments of this procedure utilise the property that it is much faster to verify an asymmetric cryptographic operation such as an RSA signature, than it is to generate the signature in the first place. For example, generation of a 1024 bit RSA signature requires 1024 squarings whereas verification requires only a single squaring. Thus a computational asymmetry may be introduced, this being particularly pronounced in so-called small exponent RSA.

In embodiments, to generate a message with the same asymmetric cryptographic signature (which in effect acts as a computational asymmetric hash) would require a large number of the relatively slow signing operations whereas verification can nonetheless be performed quickly by a recipient. Optionally, for increased security, the signing procedure may be iterated a plurality of times, for example between 1 and 10 times, to increase the factor by which verification is faster than signing.

It will be understood that in embodiments of the above methods neither the "public" key nor the "private" of the asymmetric cryptographic procedure need be protected and both these can be public.

The invention further provides computer program code, in particular on a carrier, to implement the above described methods. The carrier may comprise a data carrier such as a disk, CD-or-DVD ROM, programmed memory such as read-only memory (firmware), or an optical or electrical signal carrier. Code to implement embodiments of the invention may comprise code in a convectional programming language such as C, or lower level code such as assembly language code, or still lower level code such as microcode or code for setting up or controlling an ASIC or FPGA, or hardware description language code such as Verilog (trademark), VHDL (very high speed integrated hardware description language) or the like. The skilled person will appreciate such code (and/or data) may be distributed between a plurality of coupled components in communication with one another, for example on a network.

These and other aspects of the invention will now be described, by way of example only with reference to the accompanying figures in which.

Figure 1:
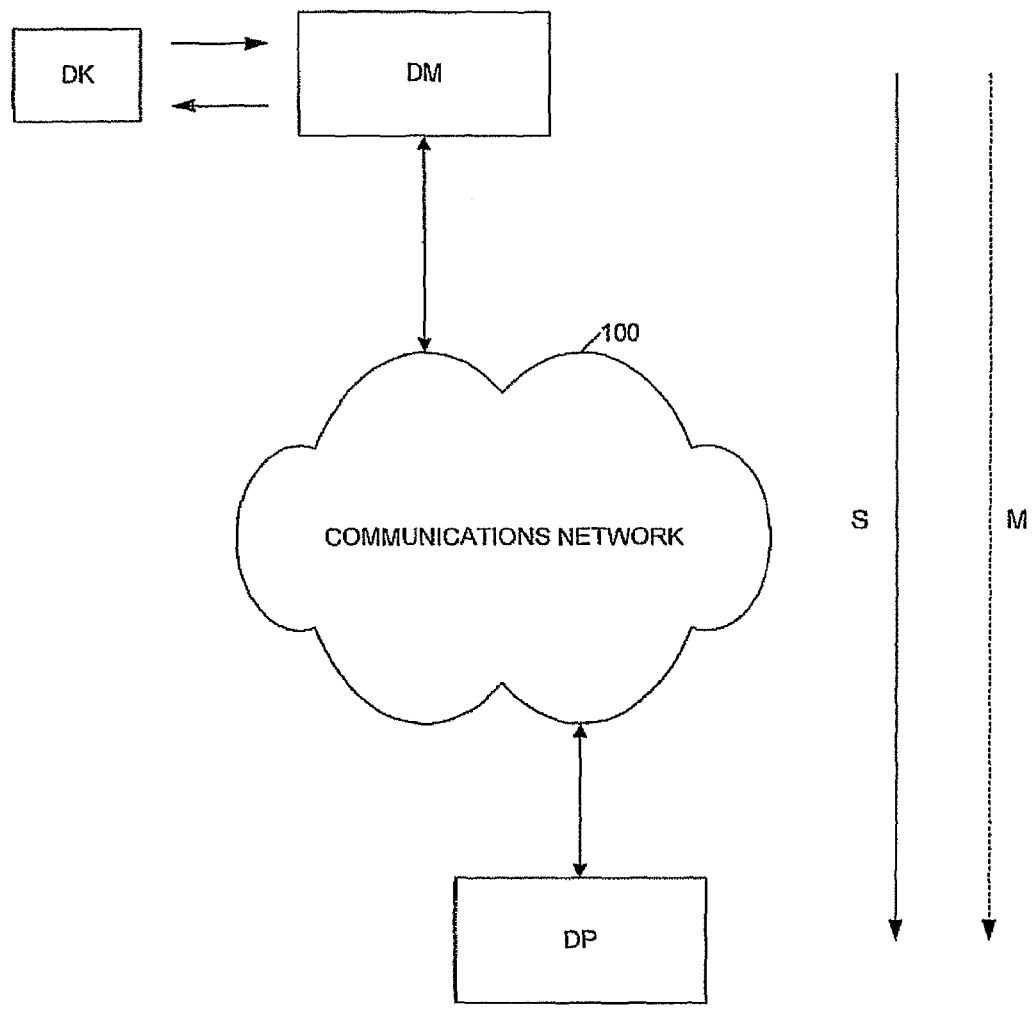
FIG. 1 shows a computer system for message signing and authentication. Comprising a hash computation device, a signing device, and a signature verification device.

It is helpful to first review time-lock puzzles as embodiments of the methods described herein preferably employ procedures of such puzzles. Although, as will be seen, these procedures are employed in a manner in which is different to their conventional application.

Broadly speaking a time lock puzzle can be defined as follows: Given some parameters N, compute a secret value B (this can be understood with reference to the example below). The puzzle is constructed in such a way that this computation, whilst possible and well-defined, requires a considerable computational effort and thus takes some time. The parameters may be chosen to control the amount of effort required.

A puzzle also has the property that the party generating the parameters N is also privy to some secret information E. Knowledge of E and N allows B to be computed far more efficiently than by use of N alone.

Such problems have been proposed for applications involving encrypted 'time-capsules'. These effectively encrypt some information such that it will take a considerable time to decrypt the information—days, weeks, or even years. The secret value E is used to 'seal' the puzzle, and is then destroyed. Only the value N remains which whilst sufficient to solve the puzzle and open the time capsule, a known (and very large) computational effort is required to do so.

The best-known time-release cryptographic scheme is due to Rivest, Shamir and Wagner (RSW', http://www.cs.berkeley.edu/~daw/papers/timelock.ps). This scheme is based on the fact that given an RSA modulus n=pq (where p and q are two (large) primes) then computing $b=a^{2^t}$ mod n requires t sequential squarings (mod n) of the value a, whereas knowledge of p and q enables the computation of $e=2^t$ (mod (p−1)(q−1)) and then $b=a^e$, both straightforward operations. By choice of the value of t, and given an estimate of the time required to perform a mod a squaring operation, the time required to compute b without knowledge of e can be set arbitrarily, whereas the time required to perform the equivalent calculation given e remains unchanged.

As the skilled person will understands broadly speaking a cryptographic hash function of a message aims to associate each possible value of a message to a unique (for all practical purposes) hash value, generally with the aim of being able to use the hash value as a short, practical representative of the message. Broadly speaking we will describe application of time-lock puzzle techniques/procedures to create a computationally asymmetric hash function. This hash function can then be used to increase the security of an electronic signature scheme which is that described above.

In this example we define a computationally asymmetric hash function J to be a cryptographic hash function with the additional property that given parameters N and E the function J can be computed far more efficiently than using the parameters N alone. As with the time-lock puzzle, the parameters N may be chosen to control the amount of computation required in the latter case. Naturally, the function J preferably also has the properties of a good cryptographic hash function.

Time-lock puzzles as described above can be used to construct such a function, by combining an output of the puzzle (B) with the message M or a hash H thereof to produce a result J(M). There are many ways in which such a combination may be achieved, but the principle is common to all.

As an example, consider the following definition of the function J, based on the RSW time-lock puzzle:
1. Choose an RSA modulus n=pq.
2. Choose the value t=TS where S is the number of modulo n squarings that can be performed in one second, and T is the number of seconds that should be required to compute the hash function without knowledge of the secret E.
3. Publish the parameters N=(n, t).
4. To compute the asymmetric hash J=J(M):
    a. Compute a conventional hash H=H(M).
    b. Treat the result H as an integer (it will typically be less than n, otherwise reduce modulo n).
    c. Compute $L=H^{2^t}$ mod n.
    d. Compute J=H(L).

In the electronic signature procedure the introduction the above steps can be employed to replace step 1, steps 2 to 5 (truncating the hash to form a challenge value C and so forth) remaining unchanged. Steps 4a and 4d above facilitate such a substitution but are optional. Step 4a aims to reduce the message to a length less than n but without this step the modulo n computation at step 4c will in any case perform this reduction. Reviewing FIG. 1 in conjunction with the described signing procedure it will be appreciated that the function of token DK may be unchanged, making improved computationally asymmetric electronic signature techniques based upon encryption using a symmetric cryptographic algorithm straightforward to implement by way of a change in the software running on device DM and, at the verification end, on device DP. It will be recognised that, in the above described example, parameters (n, t) need not be protected since the security of the procedure does not rely upon the secrecy of these parameters, and a compromise of their integrity will simply result in invalid signatures being generated and will not compromise the signature scheme in any other way. It will further be appreciated that, as computing power increases, it is a simple matter (in the above example) to increase t to maintain a desired level of security.

At the verification end step 4 can be replaced by steps 5 and 6 below:
5. With knowledge of p and q, it is possible to compute $e=2^t$ mod (p−1)(q−1). Consider E to be the secret values (e, p, q).
6. Knowing E, J=J(M) can also be computed as follows:
    a. Compute a conventional hash H=H(M).
    b. Treat the result H as an integer (it will typically be less than n, otherwise reduce modulo n).
    c. Compute $L=H^e$ mod n.
    d. Compute J=H(L).

A consequence of the nature of the time-lock puzzle is that computation of step 4c requires t sequential squarings of H modulo n, whereas step 6c, which produces an identical result, requires a single exponentiation modulo n. Note that the operation used in steps 4c and 6c is a cryptographically strong operation (the basis for the RSA cryptosystem). Therefore, this step does not significantly diminish the cryptographic strength of the resulting hash function J.

Returning again to the signature scheme described in the introduction, in embodiments of the invention the following points can be noted.

For signature creation, the only change required is to replace the hash function H used to create C on the device DM with the computationally asymmetric hash function J. Thus the public information N is preferably present on the device DM. No changes to the device DK are required.

Frequently, when deploying RSA-based cryptosystems, the integrity of the public key information must be carefully protected. However, in the case where J is as described above, substituting the parameters N=(n, t) with alternative values chosen by the attacker yields only a denial-of-service attack, since the resulting signatures would not be validated. Crucially, it does not create a threat to the signature scheme itself. Therefore, only minimal security measures need be taken to protect the integrity of the parameters N.

For the verification procedure indicated in the introduction the validating party makes changes to their system to process the new signatures. Again, this consists of replacing the hash function H used to create C with the function J. In this case, the values N and E should be available to the validating party, so that the efficient implementation of J may be used.

The secret data E should be kept confidential, since if it were to become public the security of the signature scheme would be reduced. (The scheme would not be totally compromised; rather the security advantage of using the computationally asymmetric hash function J instead of the conventional hash function H would be lost.) To do this, procedural controls and/or specialist hardware may be used.

In the case of the example presented above the operation performed using E=(e, p, q) is simply a modular exponentiation, as commonly used in RSA cryptosystems. Thus if specialist hardware is used to protect E, in many cases the existing RSA functionality of that hardware may be re-used without any changes.

In practice the validating system may generate the parameters N and E and export N for incorporation into the devices DM. This can be simpler than generating N and E in a separate system and importing their values, although this latter option is also possible.

The parameters N are preferably chosen to make the function J as computationally difficult as possible for the attacker, without creating undue inconvenience to legitimate users. As computing power increases, it may be necessary periodically to review the values chosen, and perhaps update the system in use. In the case of the example presented above this may be achieved by changing the value of t, without necessarily also changing the value of n.

Note also that, for the procedure described in the introduction:
1. No change to the token DK is required. (Due to the number and inflexibility of typically deployed tokens, such a change would typically be expensive.)
2. There is no need for a change to the signing procedure carried out by the user, and therefore no user education is required.
3. In a worst-case scenario in which the value E is lost, the consequence is simply that signature validation will be significantly slower than it was previously, not that it cannot be achieved at all. The validating party may simply operate at a reduced capacity until the parameters can be recovered or a new set created and deployed.

It is useful to outline some differences between application of a time-lock puzzle procedure to implement a time-lock puzzle per se, and implementation of a time-lock puzzle procedure in the above described example of a cryptographically asymmetric hash function. Thus in a time-lock puzzle per se the "back door" value E is destroyed after puzzle creation whereas in the above described example method it is retained for signature validation. In a time-lock puzzle per se E is used to create the puzzle and then N is used to solve it. Whereas when the asymmetric hash function is used in a (symmetric or shared key) signing procedure N is used to create the signature and then E used to validate the signature. In a time-lock puzzle the parameters are generally chosen to impose a slow-method solution time scales of from days to years whereas in embodiments of the above described methods the cryptographic asymmetrical hash function computation time is generally in the range 0.1 to 10 seconds, for example approximately one second. In the RSW time-lock puzzle described above, RSW suggested at a fixed value at a be used in the central computation $a^{2^t}$ for example, a=2 whereas in asymmetric hash function method a different, message-dependent base of exponentiation is used each tine, for example H=H(M), L=H$^{2^t}$.

Figure 2A:
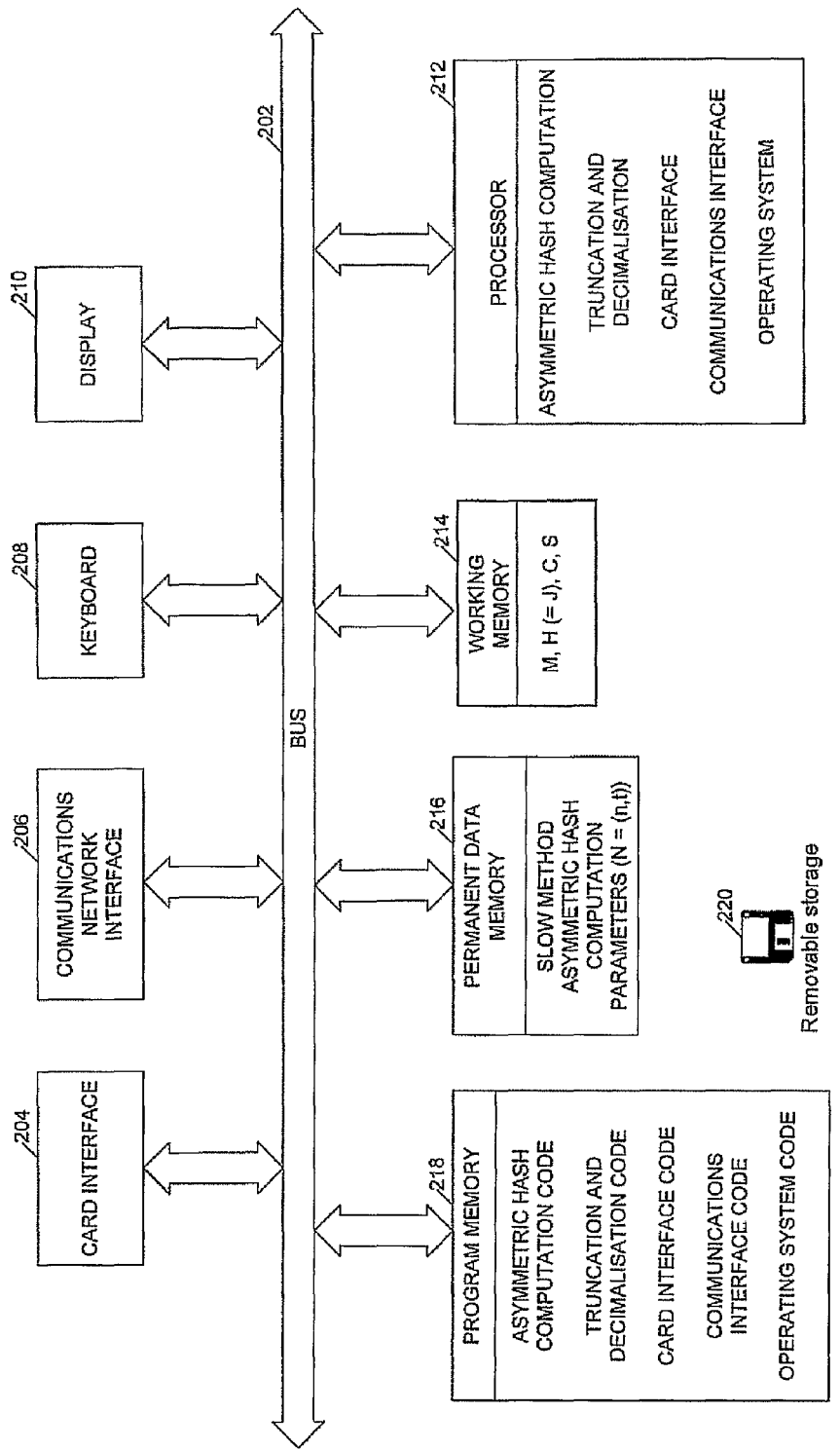
FIGS. 2a to 2c show, respectively, terminals programmed to implement the hash computation, signing and verification devices of FIG. 1.
Figure 2B:
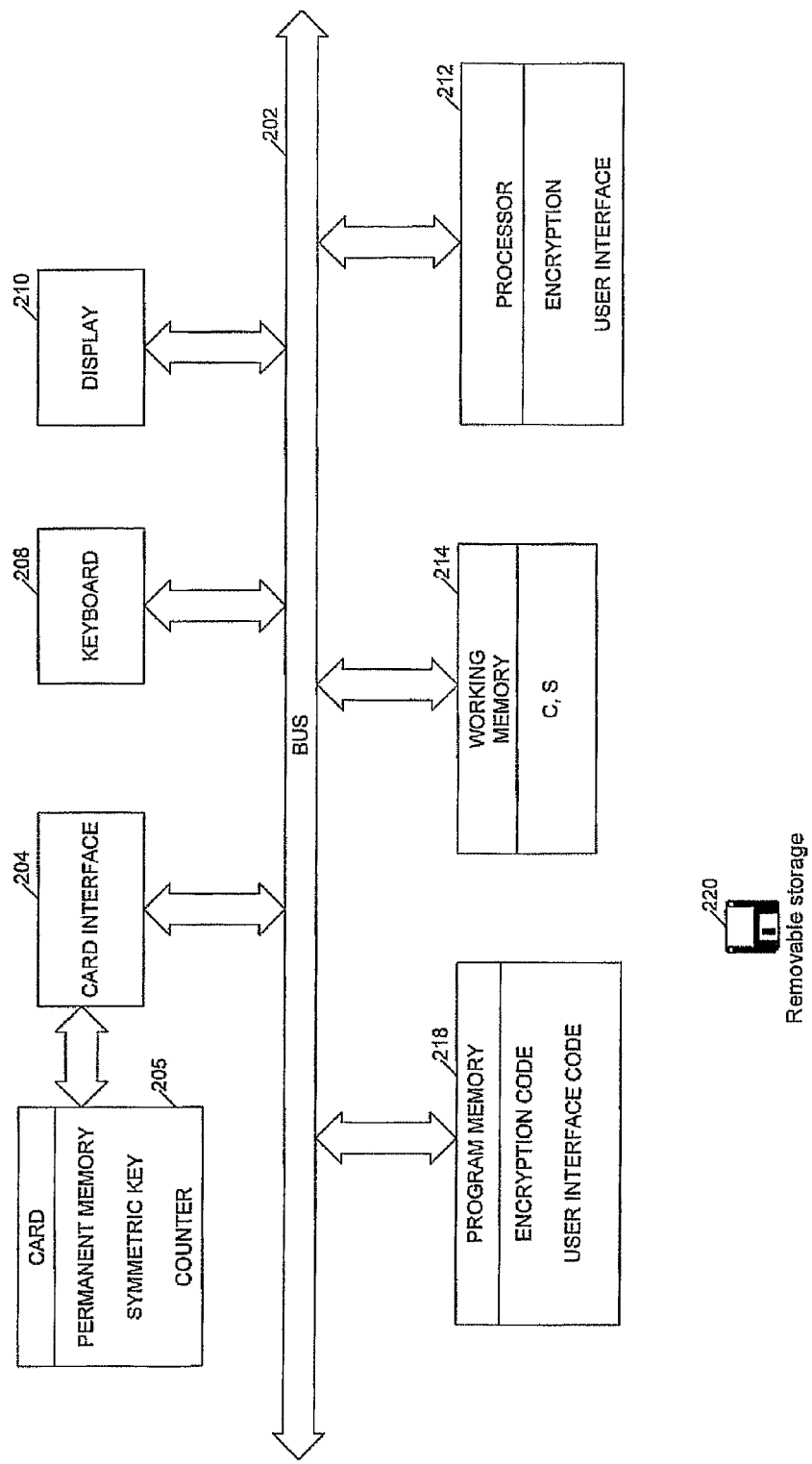
Figure 2C:
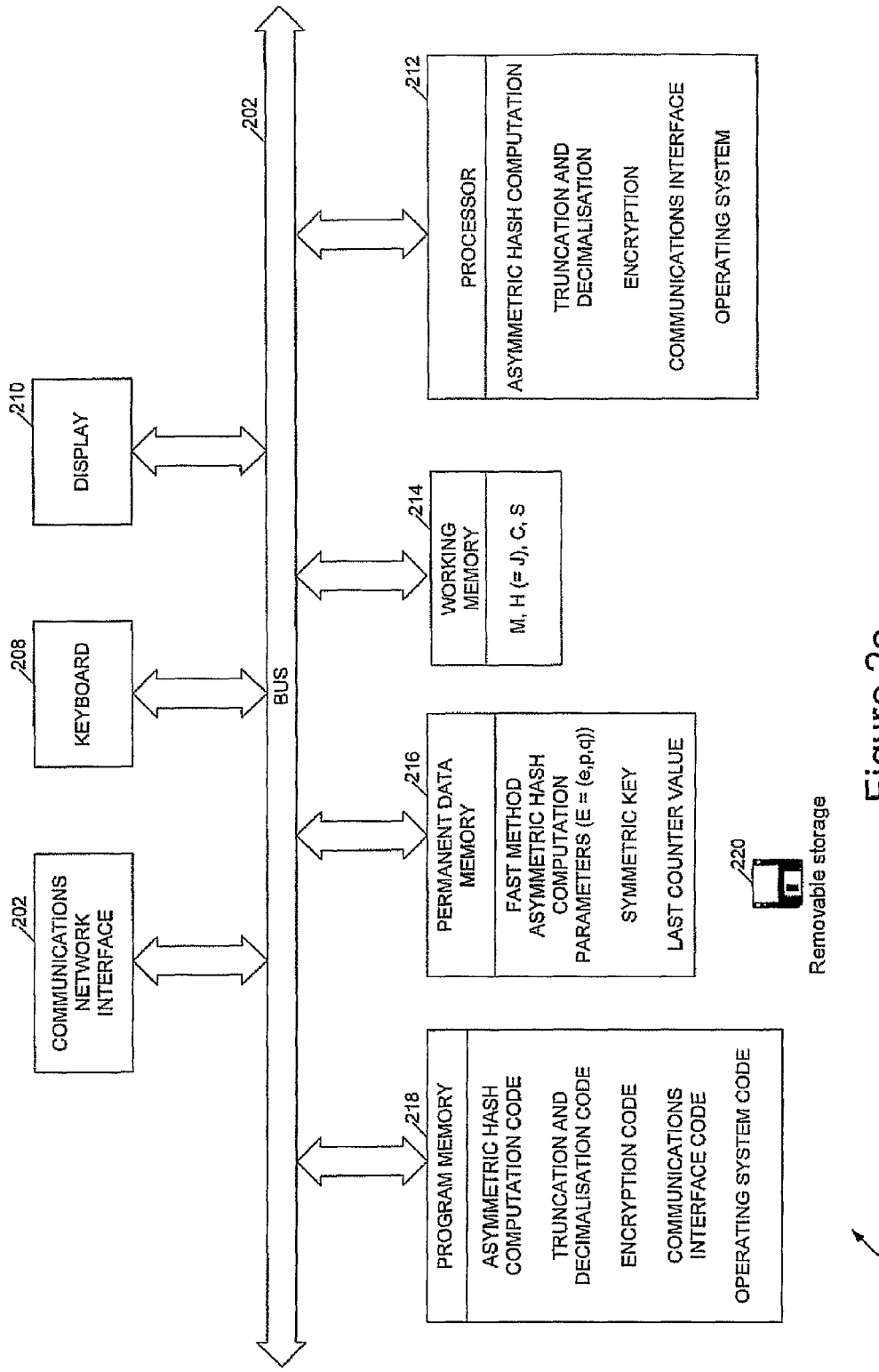
Figure 3:
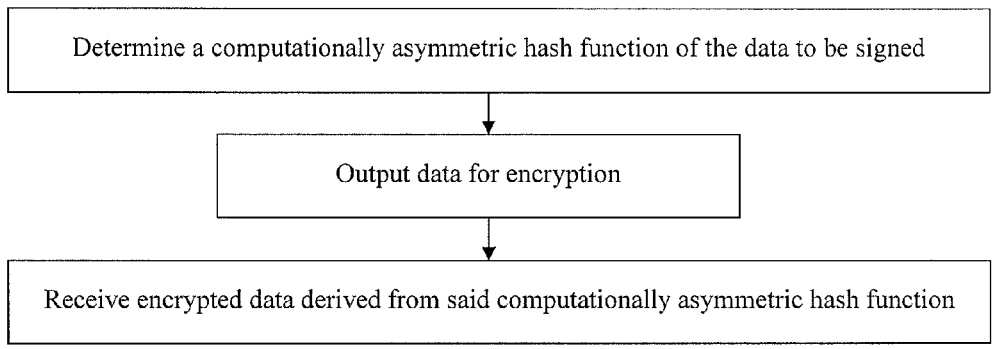
FIG. 3 shows one embodiment of a method of providing an electronic signature for data.
Figure 4:
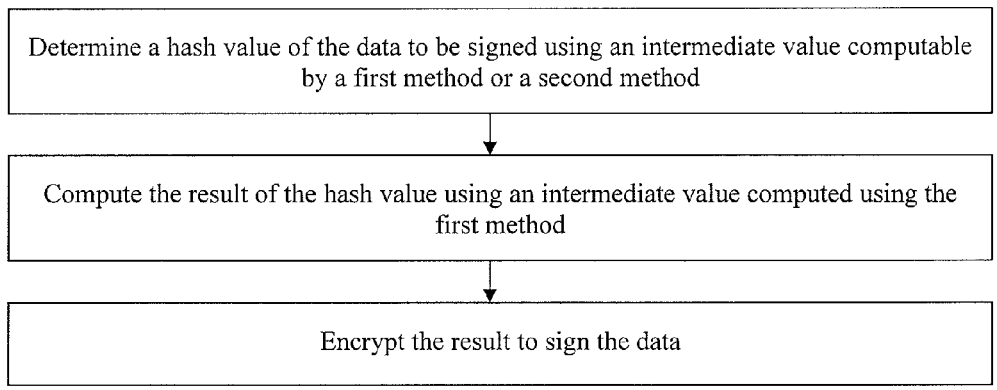
FIG. 4 shows one embodiment of a method of electronically signing data.
Figure 5:
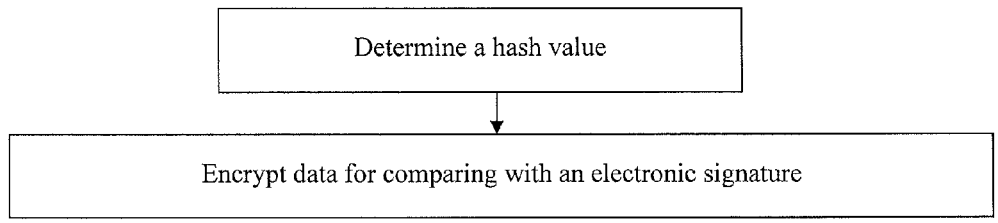
FIG. 5 shows one embodiment of a method of verifying electronically signed data.
Figure 6:
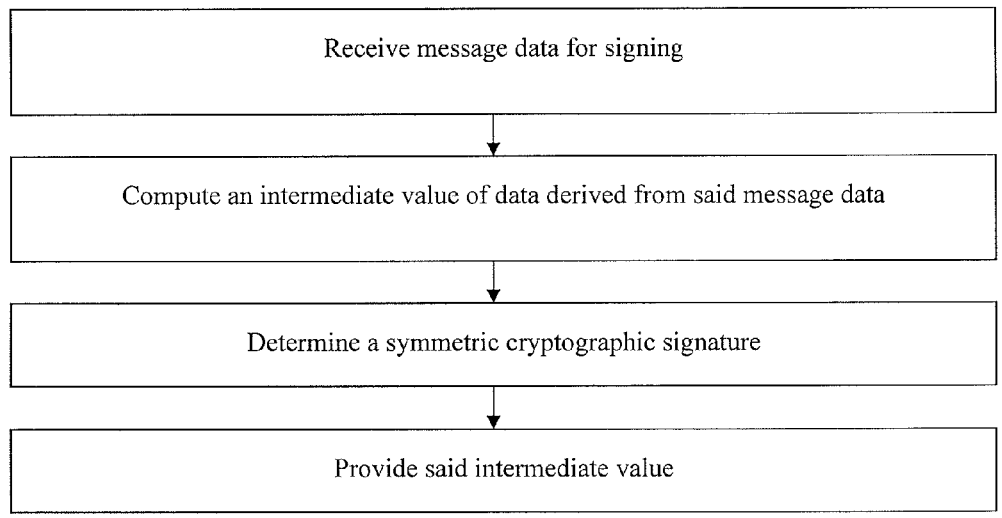
FIG. 6 shows one embodiment of a method of providing a computationally asymmetric electronic signature.
Figure 7:
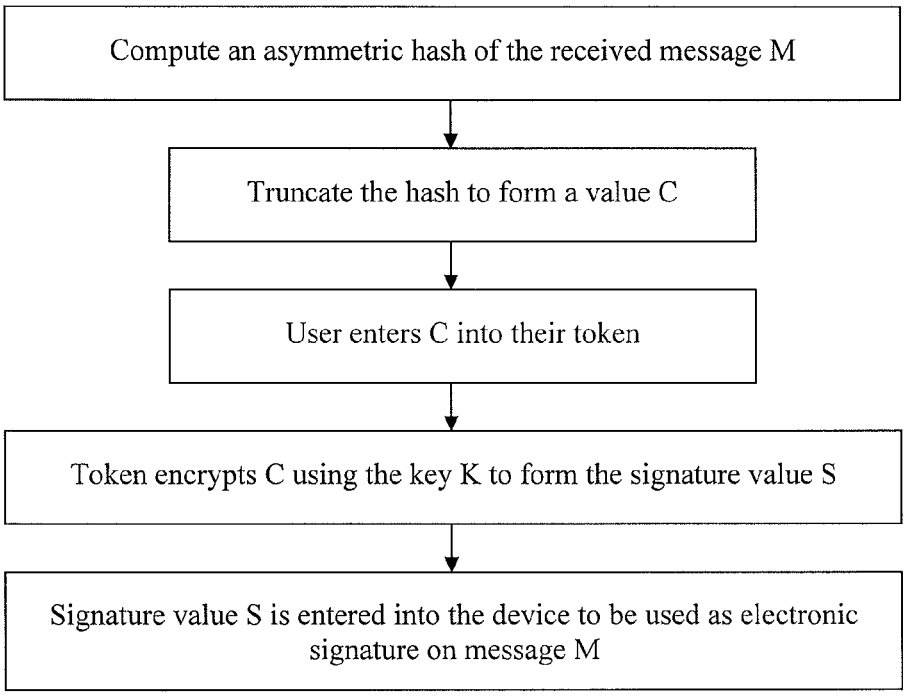
FIG. 7 shows one embodiment of a method of computing an electronic signature.
Figure 8:
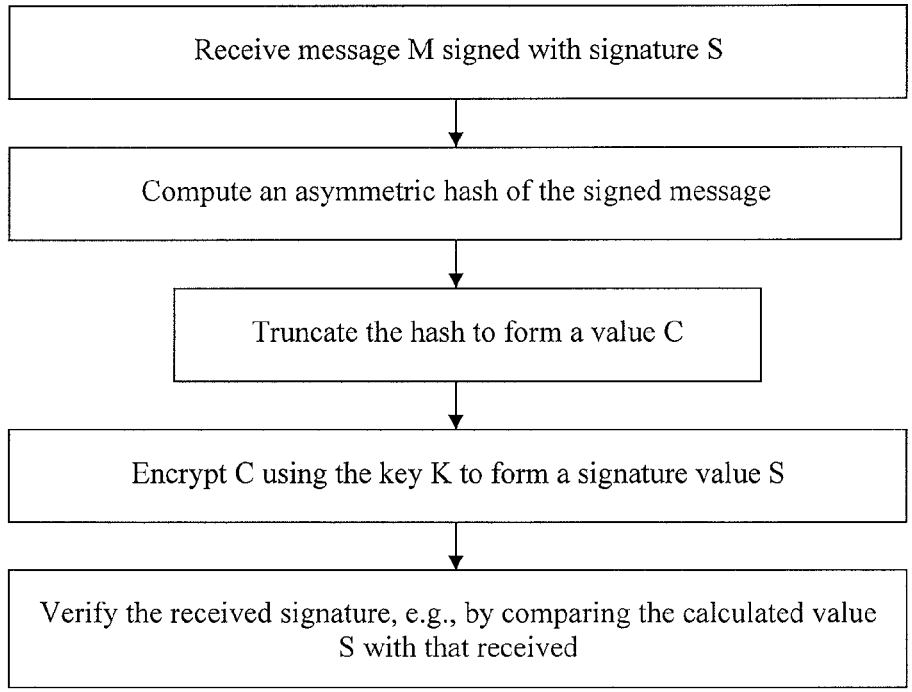
FIG. 8 shows one embodiment of a method of validating a signature.
Figure 9:
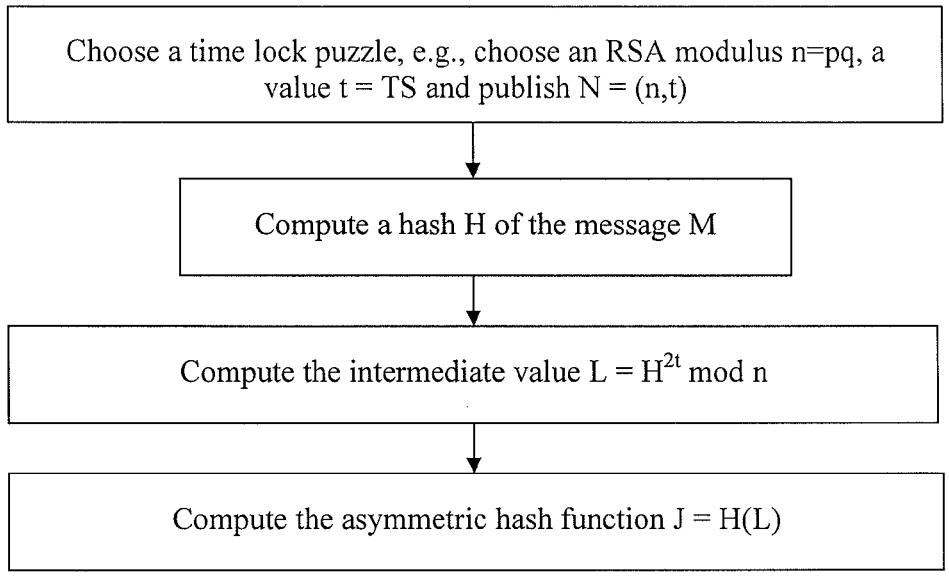
FIG. 9 shows one embodiment of a method of constructing an asymmetric hash function.
Figure 10:
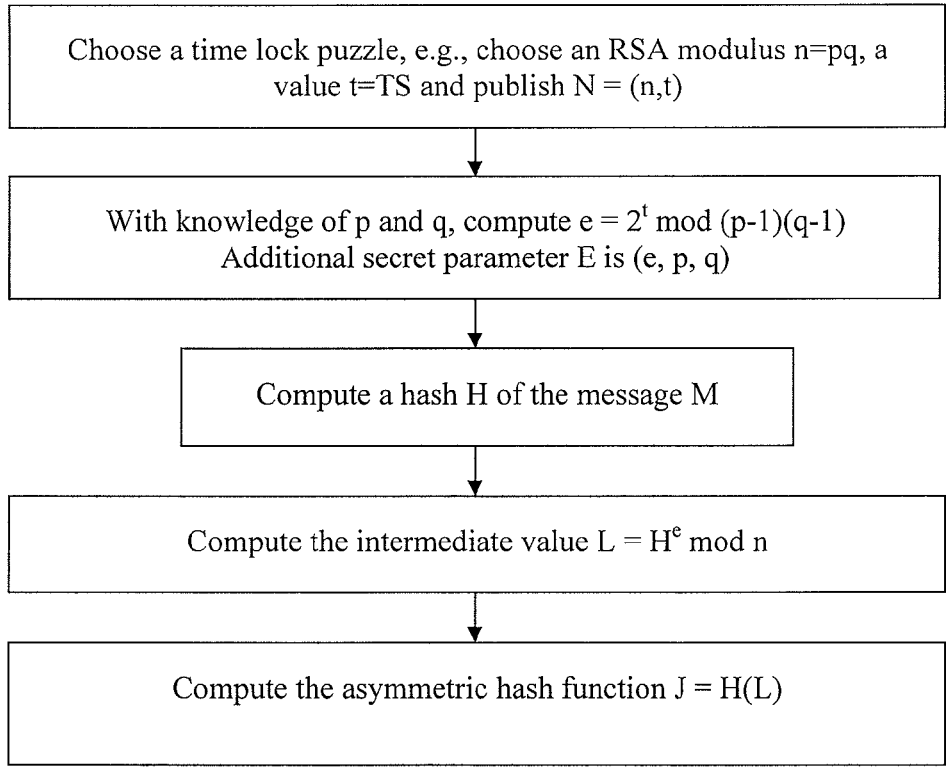
FIG. 10 shows one embodiment of a method of verification.

FIGS. 2a to 2c show devices 200a, b, c comprising data processing systems programmed to, respectively, implement an asymmetric cryptographic hash function, a symmetric signing procedure, and a procedure for verifying a signature generated by using an asymmetric cryptographic hash function. These may be implemented as devices DM, DK, and DP in FIG. 1.

In FIGS. 2a to 2c like elements are shown by like reference numerals and thus these illustrate a data processor comprising a data and address bus 202 to which are connected (in the different environments) a card in place 204, a keyboard 208 and a display 210 (optional for device DP), a processor 212, working memory 214, and permanent program memory 218 storing processor control code for controlling processor 212. Devices 200a, c (DM and DP) also include permanent data memory 216. The processor control code in program memory 218 and/or the data in data memory 216 may be provided on a removable storage medium, illustratively shown by floppy disk 220. The permanent memory may comprise, for example, one or more of a hard disk and non-volatile RAM/ROM.

In FIG. 2a system 200a (DM) has program memory storing asymmetric hash computation code, truncation and decimalisation code, hard interface code, communications code, and operating system code, loaded and implemented by processor 212 to provide the corresponding functions. Permanent data memory 216 stores parameters for computation of the asymmetric hash function by the slow method, in the above examples, N=(n,t). Working memory 214 stores M, H (as described above J), C, and after receiving input from device DK, S.

FIG. 2b shows a system 200b (device DK) with program memory 218 storing encryption code and user interface code and working memory storing truncated hash (challenge) value C input from keyboard 208 and signature value S output after computation on the display 210. Card interface 204 interfaces to a chip or smart card including permanent memory storing a symmetric key for calculating signature value S, preferably by applying the symmetric key to a counter to generate a further key which is then used to generate signature S. Again processor 212 implements the code in memory 218 to provide corresponding functions, and this code may be provided on a removable storage medium; optionally the systems of FIGS. 2a and 2b may be combined in a single system.

System 200c (DP) has program memory storing asymmetric hash computation code, truncation and decimalisation code, encryption code, communications interface code, and operating system code, loaded and implemented by processor 212 to provide the corresponding functions. Permanent data memory 216 stores parameters for computation of the asymmetric hash value by the fast method, in the above example parameters E=(e,p,q). Data memory 216 also stores the same symmetric key as employed to generate signature S, and, where a counter is used the last used counter value. Preferably at least the parameters E and the symmetric key are stored securely, for example in tamper proof hardware. Working memory 214 has the same parameters as system 200a (device DM). Thus system 200e is able to implement essentially the same procedure used to generate signature S to verify the signature, but with the difference that the fast method for computation of the asymmetric bash function value is employed.

In a variant of the above described procedure the slow computation of the asymmetric hash value involves a secondary or intermediate value L (say) that is communicated, preferably with the message M and/or signature S, back to the validator DP. The validator then uses M, L and S to validate M against S. The user does not (necessarily) see value L.

For example, one can compute a conventional RSA signature on M, using for example, a known key, to give L, then truncate this to give a challenge C (or extract C from L some other way). The validation server then validates the RSA signature L (validation being faster than signature generation) as well as checking the electronic signature S based on C.

Effectively the procedure forces the client to perform a slow operation (e.g. RSA sign), and then validates that they have done so (e.g. RSA verify), and the symmetric-key based electronic signature scheme is tied to an output of the slow operation. A disadvantage of this variant however is the 'message extension'—that is the extra data L that must be communicated.

No doubt many other effective alternatives will occur to the skilled person. It will be appreciated that embodiments of the invention can be employed in a wide range of cryptographic systems, not just for generating electronic signatures. It will therefore be understood the invention is not limited to the described embodiments and encompasses all modifications apparent to those skilled in the art lying within the spirit and scope of the claims appended hereto.

The invention claimed is:

1. A method of providing an electronic signature for data, the method comprising:
    determining a computationally asymmetric hash function J of the data to be signed using a cryptographic hash function and a time-lock puzzle by computing an intermediate value L computable by two methods, a first method and a second method, with each of the first and second methods employing at least one common first parameter N, with the first method being intrinsically sequential to compute the intermediate value L, and with the second method additionally employing at least one second parameter E, whereby the second method is not intrinsically sequential and computation of said intermediate value L by said second method is faster than by said first method, wherein said computing of said intermediate value L employs said first method; and
    receiving encrypted data derived from said computationally asymmetrical hash function to provide said electronic signature for said data.

2. A method as claimed in claim 1 wherein a difference in computation speed between said first and second methods is dependent upon a value of said common parameter.

3. A method as claimed in claim 1 wherein said intermediate value is computed from a hash of said input data.

4. A method of verifying digitally signed data, the digitally signed data including an electronic signature generated using the method of claim 1, the method comprising:
    determining an asymmetric hash function of said signed data using a cryptographic hash function and a time-lock puzzle by computing an intermediate value L computable by two methods, a first method and a second method with each of the first and second methods employing at least one common first parameter N, with the first method being intrinsically sequential to compute the intermediate value L and with the second method additionally employing at least one second parameter E whereby the second method is not intrinsically sequential and computation of said asymmetric value by said second method is faster than by said first method wherein said computing of said intermediate value employs said first method and employing said second method to compute the intermediate value L; and
    verifying said electronic signature using the asymmetric hash function determined in the previous step.

5. A method as claimed in claim 1 wherein said encrypting employs a symmetric cryptographic procedure.

6. A non-transitory computer-readable medium encoded with a data structure to, when running, implement the method of claim 1.

7. A method as claimed in claim 4 wherein said verifying comprises encrypting data derived from said asymmetric hash function result, and comparing a result of said encrypting with said electronic signature.

8. A method of electronically signing data, the method comprising:
    determining a hash value of the data to be signed using a cryptographic hash function and a time-lock puzzle algorithm for computing an intermediate value computable by a first method or a second method with each of the first and second methods employing at least one common first parameter and with the second method additionally employing at least one second parameter whereby the second method is computationally faster than said first method;
    computing the result of the hash value using the first method to compute the intermediate value L; and
    encrypting the result to sign said data.

9. A method as claimed in claim 8 wherein computation of said hash value using said second set of parameters is at least one order of magnitude faster than using said first set of parameters.

10. A non-transitory computer-readable medium encoded with a data structure to, when running, implement the method of claim 8.

11. A computer system for determining a computationally asymmetric hash function value, the computer system comprising: an input to receive data to be hashed; data memory storing asymmetric value computation parameter data; program memory storing computer program code; and a processor coupled to said data memory and to said program memory to load and implement said code, said code comprising code for controlling the processor to implement the method of claim 8.

12. A method of verifying electronically signed data, the method comprising:
    determining a hash value of at least a portion of the data to be verified using a cryptographic hash function and a time-lock puzzle algorithm for computing an intermediate value computable by a first method or a second method with each of the first and second methods employing at least one common first parameter and with the second method additionally employing at least one second parameter whereby the second method is computationally faster than said first method;
    computing the result of the hash value using the second method to compute the intermediate value L; and
    encrypting data dependent on said result for comparing with a signature of said data to verify said signed data.

13. A method as claimed in claim 12 wherein computation of said hash value using said second set of parameters is at least one order of magnitude faster than using said first set of parameters.

14. A computer system for determining a computationally asymmetric hash function value, the computer system comprising: an input to receive data to be hashed; data memory storing asymmetric value computation parameter data; program memory storing computer program code; and a processor coupled to said data memory and to said program memory to load and implement said code, said code comprising code for controlling the processor to implement the method of claim 12.

15. A method providing a computationally asymmetric electronic signature, the method comprising:
    receiving message data for signing; computing an intermediate value of data derived from said message data, wherein said intermediate value is calculated using a cryptographic hash function and a time-lock puzzle algorithm for computing an intermediate value computable by a first method or a second method with each of the first and second methods employing at least one common first parameter and with the second method additionally employing at least one second parameter whereby the second method is computationally faster than said first method and wherein said first method is employed to compute the intermediate value;
    determining a symmetric cryptographic signature of data derived from said intermediate value; and providing said intermediate value in association with said symmetric cryptographic signature to provide a computationally asymmetric signature for said message data.

16. A method as claimed in claim 15 wherein said intermediate value is computed as a hash of said message data.

17. A method as claimed in claim 15 wherein said intermediate value computing is iterated a plurality of times.

18. A method as claimed in claim 15 wherein said symmetric signature determining comprises outputting data derived from said intermediate value to a signing device and receiving said symmetric signature from said signing device.

19. A method as claimed in claim 15 wherein said intermediate value comprises an asymmetric cryptographic signature.

20. A non-transitory computer-readable medium encoded with a data structure to, when running, implement the method of claim 15.

21. A method of verifying a computationally asymmetric signature determined as set out in claim 15, the method comprising:
receiving message data and said computationally asymmetric signature; verifying said intermediate value using said message data by using a cryptographic hash function and a time-lock puzzle by computing an intermediate value L computable by two methods, a first method and a second method with each of the first and second methods employing at least one common first parameter N, with the first method being intrinsically sequential to compute the intermediate value L and with the second method additionally employing at least one second parameter E whereby the second method is not intrinsically sequential and computation of said asymmetric value by said second method is faster than by said first method wherein said computing of said intermediate value employs said first method and employing said second method to compute the intermediate value L; and verifying said symmetric cryptographic signature using said intermediate value.

22. A computer system for determining a computationally asymmetric hash function value, the computer system comprising:
an input to receive data to be hashed; data memory storing asymmetric value computation parameter data; program memory storing computer program code; and a processor coupled to said data memory and to said program memory to load and implement said code, said code comprising code for controlling the processor to implement the method of claim 15.

23. A method as claimed in claim 16 further comprising truncating said intermediate value prior to determining said symmetric cryptographic signature.

24. A method as claimed in claim 21 wherein said intermediate value comprises an asymmetric cryptographic signature.

25. A non-transitory computer-readable medium encoded with a data structure to, when running, implement the method of claim 21.

26. A computer system for determining a computationally asymmetric hash function value, the computer system comprising: an input to receive data to be hashed; data memory storing asymmetric value computation parameter data; program memory storing computer program code; and a processor coupled to said data memory and to said program memory to load and implement said code, said code comprising code for controlling the processor to implement the method of claim 21.

* * * * *